Figure 1:
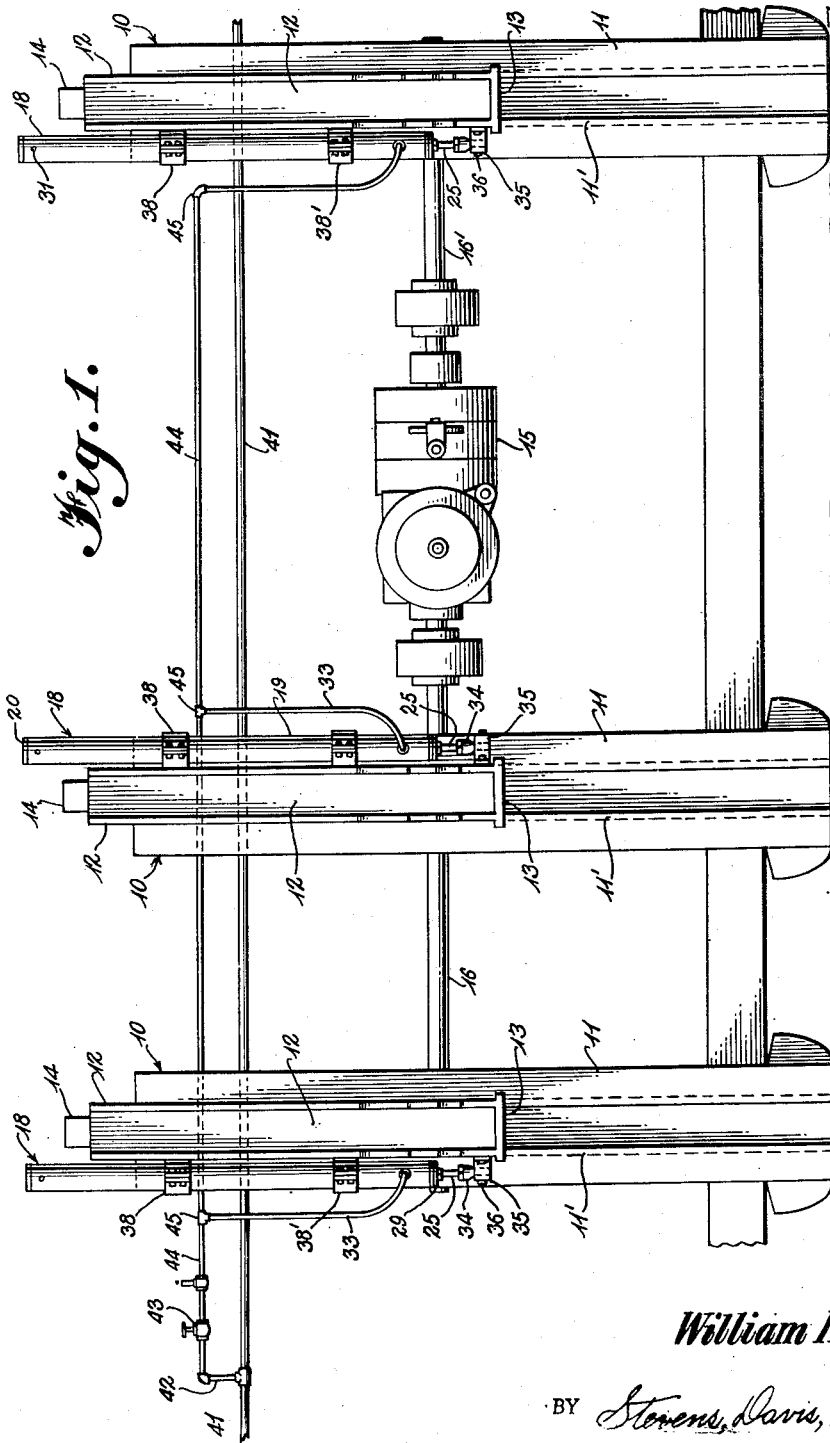

Feb. 19, 1957 W. H. SCOTT 2,781,801
AUTOMATIC AIR SNUBBER FOR SETWORK MECHANISM
Filed Jan. 13, 1955 2 Sheets-Sheet 1

INVENTOR
*William H. Scott*
BY *Stevens, Davis, Miller & Mosher*
ATTORNEYS

Feb. 19, 1957  W. H. SCOTT  2,781,801
AUTOMATIC AIR SNUBBER FOR SETWORK MECHANISM
Filed Jan. 13, 1955  2 Sheets-Sheet 2
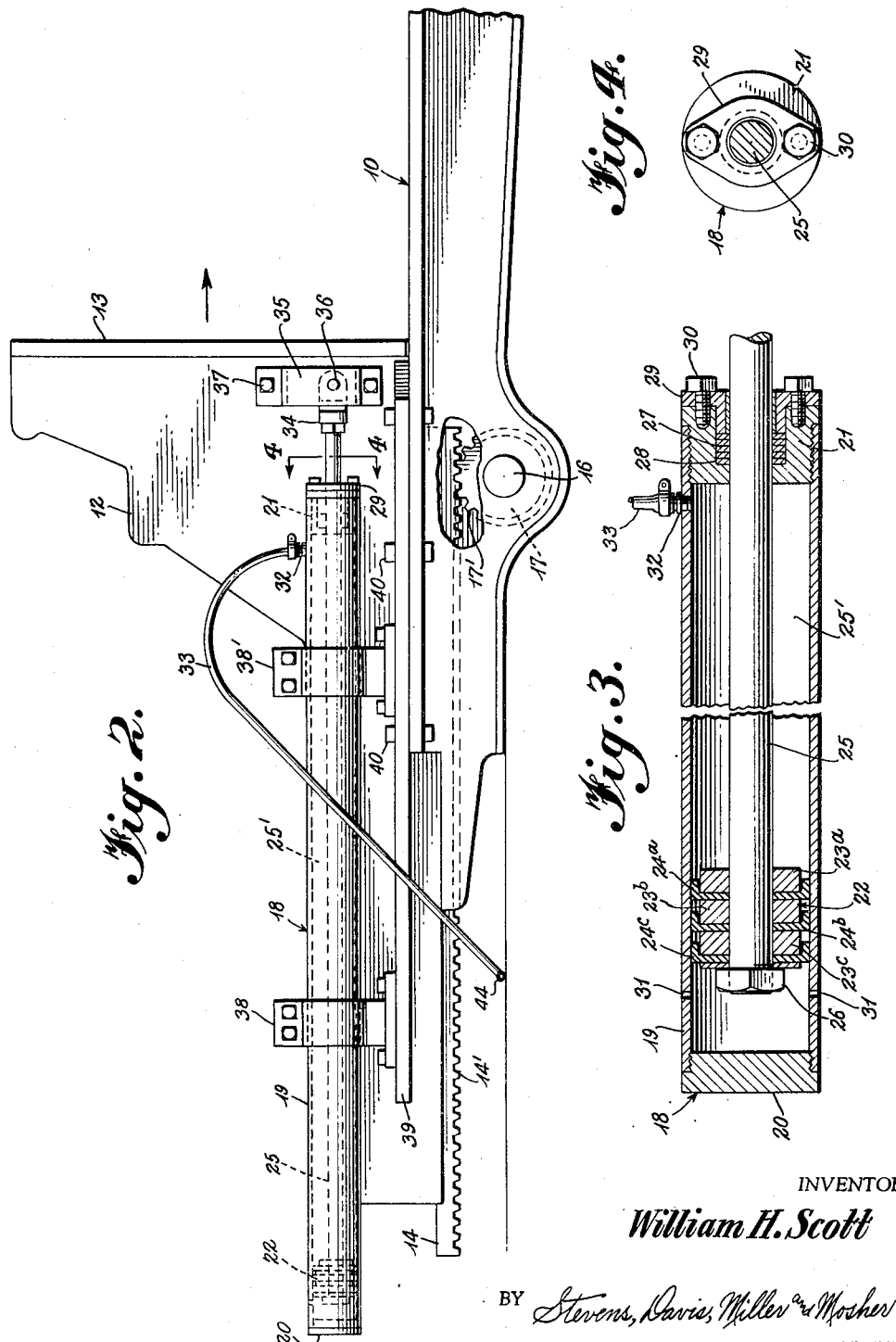
INVENTOR
*William H. Scott*
BY *Stevens, Davis, Miller & Mosher*
ATTORNEYS

United States Patent Office 2,781,801
Patented Feb. 19, 1957

2,781,801

AUTOMATIC AIR SNUBBER FOR SETWORK MECHANISM

William Harrison Scott, Jonesville, La.

Application January 13, 1955, Serial No. 481,589

1 Claim. (Cl. 143—120)

This invention relates to an improvement in the setting and resetting of a headblock knee of a sawmill setwork mechanism for cutting logs into lumber.

The sawmill cutting of logs into lumber is accomplished by placing a log on a sawmill carriage against movable headblock knees provided with gripper dogs to hold the log firmly against the face of the headblock knees while the board is being sawed therefrom. After each board is cut from the log, the log is advanced with respect to the line of cut so that another board may be sawed. This resetting and subsequent cutting of the log is continued until the log has been completely sawed into boards.

After the log has been entirely cut into boards, the movable headblock knees are retracted and another log rolled onto the sawmill carriage against the face of the headblock knees and clamped in position preparatory to being cut into boards. The same operation as described above is repeated to saw this log into boards of desired thickness.

To accomplish the setting and resetting of the logs, a plurality of aligned, movable headblock knees are positioned on a sawmill carriage transversely to the travel of the carriage. Associated with each movable headblock knee and forming a part thereof are gripper dogs or clamps which bite into the log and hold it firmly against the face of the headblock knees as the log is advanced a sufficient distance beyond the line of cut, which defines the desired thickness of board, and while the board is cut therefrom. After the log has been completely cut into lumber, the movable headblock knees are retracted and are then in a position to receive another log so that the cutting process may be repeated.

Advancement and retraction of the movable headblock knees is accomplished by a rack and pinion arrangement which moves the knees forward to a set position or retracts the knees to place them in position to receive another log. The continuous setting and receding of the headblock knees during the sawing operation produces considerable wear on the teeth of the rack and the pinion so that considerable slack or lost motion is soon introduced into the functioning of the mechanism. This slack or lost motion is, of course, well known to the art and is particularly evident in setwork mechanisms of the rack and pinion or equivalent type. Consequently, when the rack and pinion type of setting mechanism is used, the quality of the lumber produced varies due to the variation in thickness of the boards cut and the thinning of the board ends, for any spring in the log will tend to move one or more knees out of alignment with the others.

In order to obviate the difficulties experienced with the movable headblock knees due to uncontrollable slack or lost motion, the present invention provides an improved setwork mechanism in which any slack or lost motion present in the functioning parts is taken up, thereby providing a smoothly functioning and controllable mechanism, capable of producing high quality lumber having dimensional uniformity.

The present invention contemplates a sawmill setwork mechanism of the rack and pinion type in which lack of uniformity in thickness of lumber produced therefrom and the attendant disadvantages set forth above have been overcome. More specifically, the invention relates to a sawmill setwork mechanism in which an air cylinder is secured at one end to a headblock base and at the other end to the movable headblock knee, so as to hold the teeth of the rack against the teeth of the drive pinion at all times during the set so that boards cut from the log held against the headblock knees will be produced with a greater uniformity in thickness throughout the entire length of the board.

It is an object of this invention to provide an improved setwork mechanism which will eliminate uncontrollable slack or lost motion between the rack and drive pinion, or equivalent mechanism, of a sawmill setwork mechanism so that the logs to be cut can be set with greater accuracy, thereby eliminating variations in thickness of the boards cut from the logs.

Additional objects of this invention will become apparent from examination of the description, drawings, and claim.

The invention will be described further in connection with the accompanying drawings which are to be considered as an exemplification of the invention and do not constitute limitations thereof.

In the drawings:

Figure 1 is a plan view of the setwork mechanism, showing an air cylinder, attached to each of the headblock bases, with its piston rod attached to the headblock knee.

Figure 2 is a side elevational view of the retracted headblock knee, illustrating the position of the air cylinder with respect to the headblock base and the headblock knee, Figure 3 is a fragmentary, longitudinal section of the air cylinder showing the construction of the piston and the packing gland, and Figure 4 is an end elevational view, taken on line 4—4 of Figure 2, showing the piston rod end of the air cylinder.

The invention will be described in detail in connection with the accompanying drawings, in which Figure 1 shows a setwork mechanism having three knee block assemblies 10 mounted on a conventional sawmill carriage for conveying a log to be cut through a sawing operation. Each knee block assembly 10 has a headblock base 11 provided with two longitudinal ways 11' which provide the tracks in which a movable headblock knee 12 travels. To the base of each headblock knee 12 is attached a rack 14 (see Fig. 2) running longitudinally therewith, having gear teeth 14'.

Mounted on the framework of the sawmill carriage is a headblock knee driving unit 15 (see Fig. 1) which has shafts 16 and 16' coupled thereto and running transverse to the headblock bases. Shaft 16 is journaled in two of the headblock bases, and shaft 16' is journaled in the remaining headblock base. On shafts 16 and 16' are drive pinions 17, one for each headblock base, so disposed as to engage through gear teeth 17' the gear teeth 14' of rack 14 of headblock knee 12, see Figure 2. The headblock knees are positioned with respect to each other so that their faces 13 are in perpendicular alignment with the direction of travel of the sawmill carriage. Thus the rotation of shafts 16 and 16' in either direction, through the engagement of the teeth 17' of the pinion gears 17 with the teeth 14' of the racks 14, moves all headblock knees an equal distance, thereby preserving the alignment of a log clamped to the faces 13 of the headblock knees 12, except for play or lost motion between the teeth.

In the above description three knee block mechanisms have been used. It will be understood, however, that the invention is equally applicable to a sawmill carriage having any desired number of knee block mechanisms.

Disposed between each of the headblock bases and the movable headblock knees 12 is an air cylinder 18. The air cylinder 18 is defined by a steel tube 19 internally threaded at both ends, one end provided with a threaded closing plug 20 and the other end provided with a threaded gland plug 21, see Figure 3. Within the cylinder 19 is disposed a piston assembly 22 on a piston rod 25, formed from three annular metal disks 23a, 23b, and 23c, with three leather washers 24a, 24b, and 24c, sandwiched between the annular disks. Annular disk 23a is secured to the piston rod 25 by a shrink fit at a sufficient distance from the threaded end disposed within the cylinder so that alternate leather piston packings and metal circular disks can be assembled on the piston rod and held in place by a suitable nut 26 to form the piston head 22, for operating within cylinder chamber 25'. The other end of piston rod 25 extends from within the cylinder through a packing gland end 21 which contains a suitable air cylinder gland packing 27 in an annular recess 28. The packing 27 is held in place and forced against rod 25 by a flanged bonnet 29 which is held in place by two gland screws 30, see Figure 4, which threadably engage gland end 21 to form the packing gland end of the cylinder through which the piston rod 25 operates.

The cylinder wall 19 has two vent holes 31 located adjacent to the plug end for removing air from the low-pressure side of cylinder chamber 25' when the piston rod 25 moves the piston 22. At the other end of the cylinder is an air pressure connection 32 for connecting an air pressure line 33 to the cylinder chamber. The vent holes are below the stroke of the piston 22, whereas the air pressure connection 32 is above the end of the stroke of the piston 22. This allows for the operation of the piston against a continuous pressure while allowing for venting of air escaping past the piston into the low-pressure end of the cylinder chamber.

The end of piston rod 25, which extends out of the cylinder through the packing gland, is connected to the movable headblock knee 12 by a clevis 34 which is pinned to a bracket 35 by a pin 36. Bracket 35 is in turn fastened to the side of the movable headblock knee 12 by bolts 37.

The cylinder 19, in which the piston rod operates, is secured to the headblock base 11 by two brackets 38 and 38' which are bolted to base plate 39 secured to the headblock base 11 by bolts 40.

Although the air cylinders shown in the preferred embodiment of the invention have been described, it is to be understood that any commercial type of air cylinder may be used which is capable of being interposed between the headblock base and the movable headblock knee so as to provide a continuous force on the movable knee away from the log to keep the rack teeth against the pinion teeth when the log-setting mechanism is in a set position, so that no slack or lost motion will be evident during the cutting of the log into lumber.

The air cylinders are pressurized by air received from the main air-pressure line 41 (see Fig. 1) which is mounted on the sawmill carriage and serves as the air supply for all the air-operated mechanisms, such as the air-operated log gripping dogs. The air line 41 is maintained under the desired pressure by a compressor, or the like, which supplies an air-pressure reservoir or tank (not shown) to which the main air line is connected. When the pressure within the pressure reservoir drops below a predetermined minimum, the compressor operates to restore the pressure in the tank to a desired maximum, thus assuring that the 90 p. s. i. pressure in the line will be maintained. The air line 41 supplies air to the air cylinders through conduit 42 which connects the main air line to a pressure reducing valve 43. The pressure reducing valve cuts the main line pressure to 40 p. s. i. and then feeds it into header 44 from which flexible air lines 33, connected by T's 45 to the header at one end and the air cylinders at the other, supply air under pressure to the air cylinders to assure constant tooth-to-tooth contact of the gears during the set of the knee block mechanisms.

In operation, the headblock knees 12 are retracted so that a log can be placed on the sawmill carriage. The log is then clamped in place against the faces 13 of the headblock knees 12 and the headblock knees are moved forward to a set position to advance the log longitudinally in respect to the line of cut. This advancement places the log in the desired position to be conveyed into the saw in order to have a board cut therefrom.

The backlash or lost motion is removed from each of the headblock knees by the function of the piston rod 25 operating against a positive pressure in the air cylinder chamber 25'. The pressure in the cylinder chamber provides the continuous force on piston head 26, which force is transmitted to headblock knee 12 through piston rod 25 to hold the teeth 14' of rack 14 firmly against the teeth 17' of the driving pinion 17.

After the sawmill carriage has passed the log through a sawing operation and a board has been cut from the log, the headblock knees are simultaneously reset by the operation of the drive shaft through the pinion thereon, which resets all the knees in unison so that another board of the desired thickness may be cut. The air cylinders, one for each knee, again hold the pinion-engaging teeth of each rack against the pinion teeth so that, during the sawing operation, all knees are kept perfectly in line and in the desired position. This arrangement eliminates slack in the setwork mechanism, which develops from wear, by holding this constant pressure on the knee in the direction away from the log. The elimination of slack prevents oversetting of the work as well as preventing one knee from being pulled forward by any spring that may be in the log during the cutting operation, thereby eliminating uneven thickness of boards and thin ends.

It is further pointed out that the snubbing action provided by the air cylinders is entirely automatic, requiring few functional parts and no thought or action by the carriage operator.

Although the invention has been illustrated using a conventional rack and pinion setwork mechanism, it will be understood that the improvement set forth may be used with any other equivalent mechanism that operates in a similar manner or where the setting up is effected pneumatically but controlled by such mechanism. It is also to be understood that the invention is limited only to the scope of the appended claim and various changes may be made in the details of construction without departing from the invention or sacrificing any advantages thereof.

What is claimed is:

In a sawmill setworks comprising a sawmill carriage for conveying a log during a sawing operation, a plurality of headblock bases fixed on said carriage and positioned transverse to the direction of travel thereof; a plurality of headblock knees, one on each of said bases, having their faces arranged parallel to the direction of travel of said carriage and adapted to slide in relationship to said base; a plurality of toothed racks, one secured to each of said knees; a plurality of toothed setting pinions one engaging each of said toothed racks for advancing and retracting said knees in unison to maintain their parallel face arrangement; and a plurality of air cylinders with the cylinder of each attached to one of said bases and the piston rod attached to the said corresponding knee, and air under pressure supplied to each of said air cylinders to maintain a continuous equalized force on all knees in a direction opposite to that of set as said knees are advanced and retracted to a set position thereby holding the teeth of said racks in intimate contact with the teeth of said pinion during all stages of the sawing operation preventing oversetting of said setworks during the sawing operation.

References Cited in the file of this patent

UNITED STATES PATENTS

| | | |
|---|---|---|
| 1,412,797 | Biedermann | Apr. 11, 1922 |
| 1,561,341 | Martin | Nov. 10, 1925 |
| 1,978,852 | Allard et al. | Oct. 30, 1934 |
| 2,707,501 | Craik | May 3, 1955 |